United States Patent [19]

Skrycki

[11] 4,405,138
[45] Sep. 20, 1983

[54] ENGINE GASKET ASSEMBLY

[75] Inventor: Robert R. Skrycki, Grosse Ile, Mich.

[73] Assignee: Ex-Cell-O Corporation, Troy, Mich.

[21] Appl. No.: 423,588

[22] Filed: Sep. 27, 1982

[51] Int. Cl.³ ............................................. F16J 15/12
[52] U.S. Cl. ................................ 277/235 B; 277/22; 277/166
[58] Field of Search .................. 277/235 B, 166, 22, 277/217

[56] References Cited

U.S. PATENT DOCUMENTS

| | | | |
|---|---|---|---|
| 1,903,990 | 4/1933 | Fitzgerald | 277/235 B |
| 2,167,643 | 8/1939 | Dickson | 277/235 B |
| 3,473,813 | 10/1969 | Meyers et al. | 277/166 |
| 3,567,234 | 3/1971 | Skrycki | 277/235 B |
| 3,944,235 | 3/1976 | Gordon | 277/22 |
| 4,072,316 | 2/1978 | Decker et al. | 277/166 |

Primary Examiner—Robert I. Smith
Attorney, Agent, or Firm—John P. Moran

[57] ABSTRACT

A cylinder head or manifold gasket assembly including a gasket body having fluid passage openings formed therein, with molded rubber grommets mounted in the openings. The openings and grommet bodies may be any predetermined peripheral matching shape. Oppositely disposed pairs of recesses are formed in the gasket body adjacent each opening on each side of the gasket body, with the centerlines of the respective pairs being at right angles to each other. Oppositely disposed pairs of mounting tabs are formed outwardly of the grommet body adjacent the respective end faces thereof so as to mount in the respective recesses, thereby eliminating the need for adhesive or mechanical clinching at assembly.

5 Claims, 3 Drawing Figures

ENGINE GASKET ASSEMBLY

TECHNICAL FIELD

This invention relates generally to engine gasket assemblies and, more particularly, to such assemblies including gasket bodies having fluid passage openings formed therein and molded rubber grommets or seals mounted in the openings.

BACKGROUND ART

Heretofore grommets have been either cemented within the walls of openings formed in cylinder head or manifold gasket bodies, as shown and described in McDowell U.S. Pat. No. 4,103,913, or have included flanges which are adapted to projecting into the gasket body material, so as to be anchored permanently therein adjacent an outer metal layer, as shown and described in Aukers U.S. Pat. No. 2,395,243. Other gasket bodies have been known to include means for mechanically clinching its grommets, such as by the use of dovetail-shaped slots formed at spaced intervals completely through the gasket body material around the periphery of each opening.

DISCLOSURE OF THE INVENTION

A general object of the invention is to provide an improved cylinder head or manifold gasket assembly including a gasket body having at least one coolant or lubricant passage opening formed therein and a molded rubber seal mounted in the opening without having to be adhesively mounted or permanently anchored in the gasket body.

Another object of the invention is to provide an engine gasket assembly which includes a gasket body having coolant or lubricant openings formed therein, with grommets mounted in such openings, wherein the need for adhesively or mechanically fastening the grommets is eliminated by virtue of the grommets having opposed pairs of locking tabs or flanges formed, respectively, on the major and minor axes thereof, adjacent opposite faces of each grommet, for mounting cooperation with oppositely disposed respective recesses formed on opposite sides of the cylinder head gasket body.

These and other objects and advantages of the invention will be apparent when reference is made to the following description and accompanying drawings.

BEST MODE OF CARRYING OUT THE INVENTION

Figure 1:
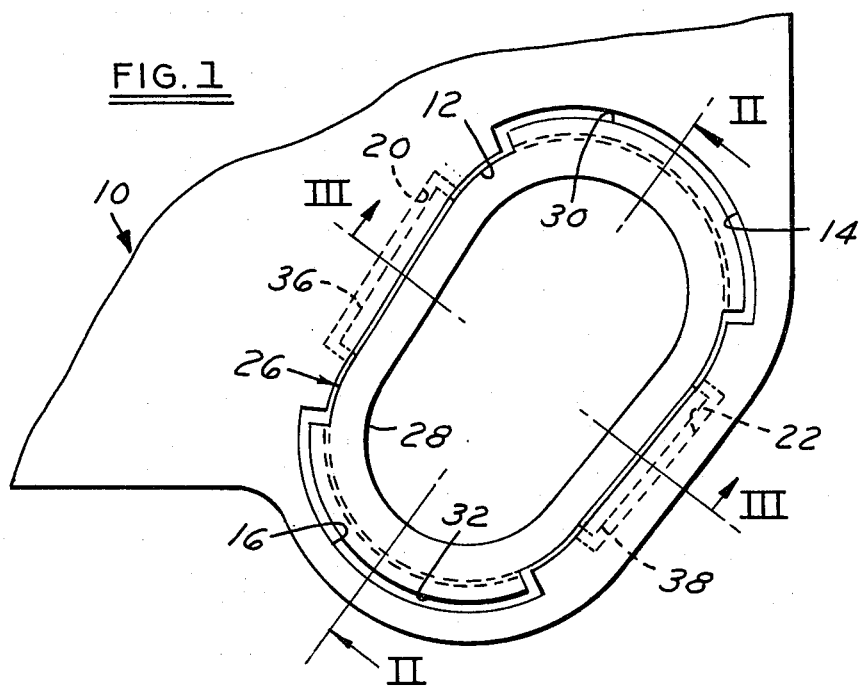
FIG. 1 is a fragmentary plan view of a cylinder head gasket embodying the invention.
Figure 2:
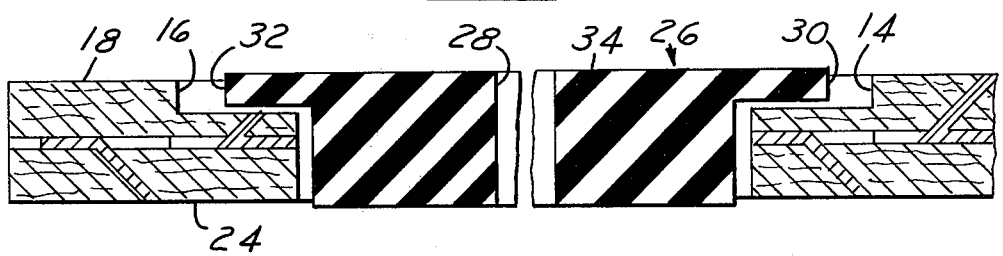
FIG. 2 is an enlarged cross-sectional view taken along the plane of the line 2—2 of FIG. 1, and looking in the direction of the arrows.
Figure 3:
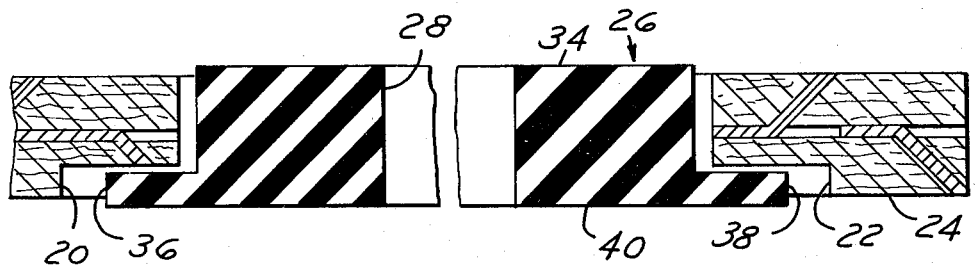
FIG. 3 is an enlarged cross-sectional view taken along the plane of the line 3—3 of FIG. 1, and looking in the direction of the arrows.

Referring now to the drawings in greater detail, FIG. 1 includes a cylinder head or manifold gasket body 10 consisting of a suitable composite gasket body material, which may include a metallic core, and having one or more openings 12 formed therein. Such openings may be circular, oval-shaped, or elongated with parallel sides and rounded ends. It is the latter shape which is illustrated in the drawings. Oppositely disposed arcuate-shaped recesses 14 and 16 are formed adjacent one end 18 of the opening 12 with their centers positioned at opposite ends of the major or longitudinal axis of the opening. Oppositely disposed linear recesses 20 and 22 are formed adjacent the other end 24 of the opening 12 with their centers positioned at opposite ends of the minor centerline or axis of the opening.

A molded rubber seal or grommet 26 is adaptable to being mounted in each opening 12 of the gasket body 10 without the aid of an adhesive or mechanical fastening. The seal 26 is formed to include a tubular body portion 28 which fits loosely but uniformly inside the opening 12. Arcuate-shaped locking tabs or flanges 30 and 32 are formed on the body portion 28 at the ends of the major axis thereof, adjacent one end face 34 of the body portion 28. The tabs 30 and 32 are seated in the recesses 14 and 16, respectively, of the gasket body 10. Linear-shaped locking tabs or flanges 36 and 38 are formed on the body portion 28 at the ends of the minor axis thereof, adjacent the other end face 40 of the body portion 28.

It's apparent that, during assembly, the rubber seal 26 is simply squeezed along one of its longitudinal or lateral centerlines and placed in the opening 12 until the particular tabs on the underside thereof, upon being released, snap outwardly into the cooperating oppositely disposed recesses of the gasket body.

It should be noted that, once assembled, the overall height of the rubber grommet 26 is greater than the thickness of the gasket body 10, with predetermined spaces existing between the recesses and the respective cooperating grommet flanges. This is so that upon being confined between an engine block and head, the grommet or seal will be compressed to thereby serve as a seal around the opening 12.

Industrial Applicability

It's apparent that the invention provides a gasket body and molded rubber seal which may be quickly and efficiently assembled together, without any need for adhesive or mechanical fastening elements, and, once assembled, will not become dislodged during normal handling and installation.

While but one embodiment of the invention has been shown and described, other modifications thereof are possible.

The embodiments of the invention in which an exclusive property or privilege is claimed are defined as follows:

1. An engine gasket assembly adapted to being positioned between engine components, said gasket assembly comprising a gasket body having first and second planar surfaces and at least one opening for a fluid passage formed therethrough, a first pair of oppositely disposed recesses formed adjacent the opening in the first planar surface, a second pair of oppositely disposed recesses formed adjacent the opening in the second planar surface with the centerline therebetween at right angles to the centerline between said first pair of recesses, a molded rubber grommet having a tubular body portion mounted inside the opening, a first pair of oppositely disposed locking tabs formed on the outer surface of said grommet adjacent one face thereof and seated in said first pair of oppositely disposed recesses, and a second pair of locking tabs formed on the outer surface of said grommet adjacent the other face thereof and seated in said second pair of oppositely disposed recesses.

2. The engine gasket assembly described in claim 1, wherein said opening in said gasket body and said tubular body portion of said grommet are each an elongated opening with parallel sides and rounded ends.

3. The engine gasket assembly described in claim 2, wherein said first pair of recesses and said first pair of locking tabs are arcuate-shaped with their centers positioned along the major axis of the elongated opening.

4. The engine gasket assembly described in claim 2, wherein said second pair of recesses and said second pair of locking tabs are linear in shape with their centers positioned along the minor axis of the elongated opening.

5. The engine gasket assembly described in claim 1, wherein said opening in said gasket body and said tubular body portion of said grommet are each formed in any predetermined matching shape.

* * * * *